(12) United States Patent
Jung et al.

(10) Patent No.: US 10,539,832 B2
(45) Date of Patent: Jan. 21, 2020

(54) PHOTO ALIGNMENT AGENT AND LIQUID CRYSTAL DISPLAY

(71) Applicant: SAMSUNG DISPLAY CO., LTD., Yongin-si, Gyeonggi-do (KR)

(72) Inventors: Jin-Soo Jung, Hwaseong-si (KR); Suk Hoon Kang, Seoul (KR); Baek Kyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 242 days.

(21) Appl. No.: 15/618,501

(22) Filed: Jun. 9, 2017

(65) Prior Publication Data

US 2017/0371209 A1 Dec. 28, 2017

(30) Foreign Application Priority Data

Jun. 28, 2016 (KR) .................. 10-2016-0081036

(51) Int. Cl.
| | |
|---|---|
| *G02F 1/1337* | (2006.01) |
| *C08G 73/10* | (2006.01) |
| *C08G 73/16* | (2006.01) |
| *C09K 19/56* | (2006.01) |
| *C09K 19/30* | (2006.01) |
| *G02F 1/1333* | (2006.01) |

(52) U.S. Cl.
CPC ... *G02F 1/133723* (2013.01); *C08G 73/1042* (2013.01); *C08G 73/16* (2013.01); *C09K 19/3068* (2013.01); *C09K 19/56* (2013.01); *G02F 1/133788* (2013.01); *G02F 2001/133397* (2013.01)

(58) Field of Classification Search
CPC .... G02F 1/133723; C09K 19/56; C08G 73/10
See application file for complete search history.

(56) References Cited

U.S. PATENT DOCUMENTS

2017/0058200 A1* 3/2017 Eckert .............. G02F 1/133788

FOREIGN PATENT DOCUMENTS

| JP | 2014-029465 A | 2/2014 |
|---|---|---|
| KR | 10-2007-0060258 A | 6/2007 |
| KR | 10-2014-0002483 A | 1/2014 |
| KR | 10-1490488 B1 | 1/2015 |
| KR | 10-2015-0040734 A | 4/2015 |
| KR | 10-2015-0047398 A | 5/2015 |
| KR | 10-2016-0041754 A | 4/2016 |

OTHER PUBLICATIONS

Nobuhiro Kawatsuki et al. "Axis-Selective Photo-Fries Rearrangement and Photoinduced Molecular Reorientation in Liquid Crystalline Polymer Films", Macromolecules 2011, 44, 5736-5742.

* cited by examiner

*Primary Examiner* — Gregory Listvoyb
(74) *Attorney, Agent, or Firm* — Cantor Colburn LLP

(57) ABSTRACT

A photo alignment including a copolymer of a diamine and a dianhydride, wherein the copolymer includes a repeating unit including a first group derived from the diamine and a second group derived from the dianhydride, and wherein any one of the first group and the second group includes a photoreactive group and the other one of the first group and the second group includes at least one selected from a tert-butyl group, a tert-butoxy group, a tert-butyloxycarbonyl group, and a di-tert-butyloxycarbonyl group.

6 Claims, 2 Drawing Sheets

PHOTO ALIGNMENT AGENT AND LIQUID CRYSTAL DISPLAY

This application claims priority to Korean Patent Application No. 10-2016-0081036 filed in the Korean Intellectual Property Office on Jun. 28, 2016, and all the benefits accruing therefrom under 35 U.S.C. § 119, the content of which is incorporated herein in its entirety by reference.

BACKGROUND

(a) Technical Field

The present disclosure relates to a photo alignment agent and a liquid crystal display (LCD).

(b) Description of the Related Art

A liquid crystal display (LCD) includes a display panel including field generating electrodes such as a pixel electrode and a common electrode and a liquid crystal layer in which an electric field generated by the field generating electrodes is formed.

The liquid crystal display (LCD) displays an image by forming an electric field in the liquid crystal layer, and thus, by controlling motion of liquid crystal molecules included in the liquid crystal layer and adjusting the transmittance of a light passing through the liquid crystal layer.

In order to determine a direction of the liquid crystal molecules, initial alignment of the liquid crystal molecules may be induced, and the degree of uniformity in liquid crystal alignment is the most important factor for determining the superiority of image quality of the liquid crystal display.

In a rubbing method as a conventional method of aligning liquid crystal molecules, a polymer film such as a polyimide is coated on a substrate, and a surface of the polymer film is rubbed in a predetermined direction using a fiber such as nylon or polyester. However, in the rubbing method, fine dust or static electricity may be generated when the polymer film is rubbed with the fiber, and the fine dust or static electricity may cause a serious problem when a liquid crystal panel is manufactured.

In order to solve the problem, a photo alignment method in which anisotropy is induced to a polymer film by photo-radiation so as to align liquid crystal molecules has been an object of recent active research.

The above information disclosed in this Background section is only for facilitation of understanding of the background of the present disclosure, and therefore, may contain information that does not form the prior art that is already known in this country to a person of ordinary skill in the art.

SUMMARY

The exemplary embodiments provide a photo alignment agent and a liquid crystal display (LCD) in which an after-image is minimized.

A photo alignment agent according to an exemplary embodiment includes a copolymer of a diamine and a dianhydride, the copolymer includes a repeating unit including a first group derived from the diamine and a second group derived from the dianhydride, and any one of the first group and the second group includes a photoreactive group and the other one of the first group and the second group includes at least one selected from a tert-butyl group, a tert-butoxy group, a tert-butyloxycarbonyl group, and a di-tert-butyloxycarbonyl group.

The repeating unit may include a first repeating unit represented by Formula 1 and a second repeating unit represented by Formula 2.

Chemical Formula 1

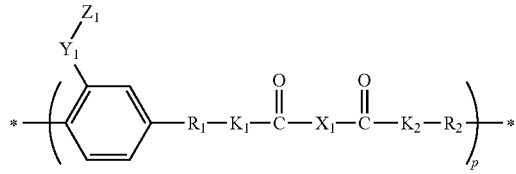

Chemical Formula 2

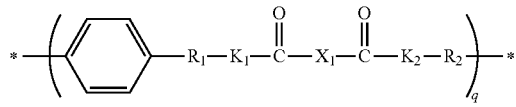

In Formula 1, $Y_1$ is $-(CH_2)_n-$, wherein n is 1 to 20, $Z_1$ is a group selected from

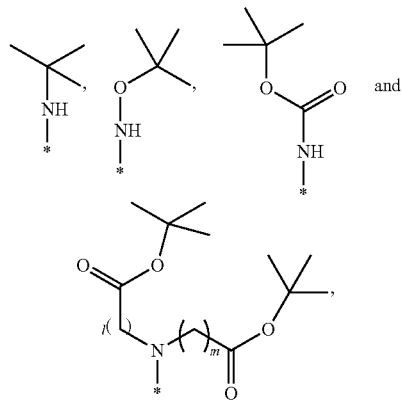

wherein m and l are each independently an integer ranging from 1 to 4, and in Formula 1 and Formula 2, $K_1$ and $K_2$ are each independently a single bond, an oxygen atom or $-NH-$;

$X_1$ is

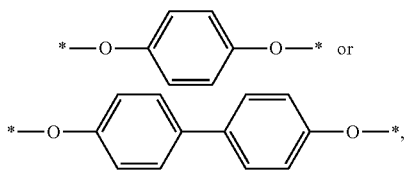

$R_1$ and $R_2$ are each independently

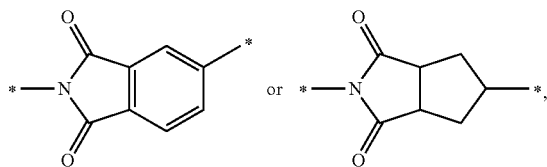

* indicates a point of attachment bonded to —$K_1$—C(=O)— or —$K_2$—C(=O)—, and p and q are each independently an integer ranging from 10 to 2,000.

In the repeating unit, an amount of the first repeating unit may be 3 weight percent to 15 weight percent based on a total 100 weight percent of the repeating unit.

In Formula 1 and Formula 2,

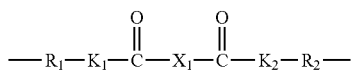

may be each independently

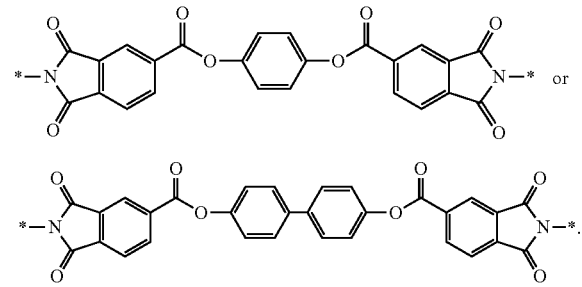

The repeating unit may include a third repeating unit represented by Formula 3 and a fourth repeating unit represented by Formula 4.

Chemical Formula 3

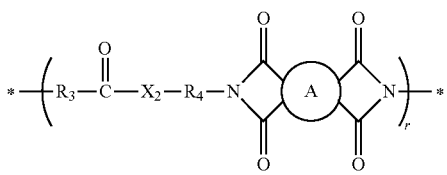

Chemical Formula 4

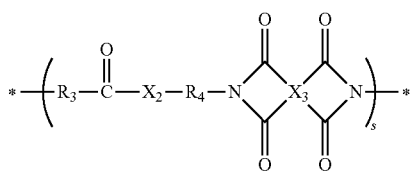

In Formulae 3 and 4, $X_2$ is a sulfur atom, an oxygen atom or —NH—, at least one side of the $R_3$ and $R_4$ includes an aromatic ring and at least one point of attachment of —C(=O)—$X_2$— is bonded to the aromatic ring, and in Formula 3,

Ⓐ is a group selected from

Z₂ | Z₂ | Z₂
Y₂ | Y₂ | Y₂

(cyclopentyl), (cyclohexyl), and (phenyl), $Y_2$ is —$(CH_2)_n$—, wherein n is 1 to 20, $Z_2$ is a group selected from (tert-butyl-NH-*), (tert-butoxy-NH-*), (Boc-NH-*) and (tert-butyl ester / dicarbamate structure), wherein m and l are each independently an integer ranging from 1 to 4, and in Formula 4, $X_3$ is a tetravalent organic group derived from an alicyclic acid dianhydride or an aromatic acid dianhydride, and r and s are each independently an integer ranging from 10 to 2,000.

In the repeating unit, an amount of the third repeating unit may be 3 weight percent to 15 weight percent based on a total 100 weight percent of the repeating unit. In Formula 3 and Formula 4,

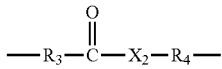

may be each independently one selected from

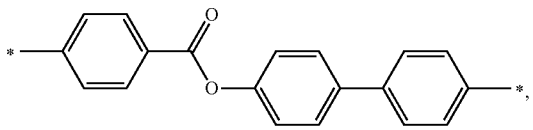

-continued

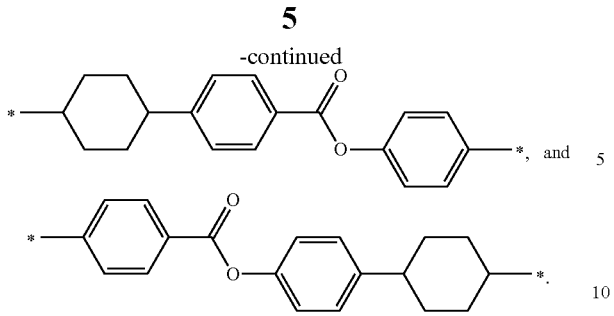
, and

A liquid crystal display (LCD) according to an exemplary embodiment includes a substrate, a counter member overlapped with the substrate, a liquid crystal layer positioned between the substrate and the counter member, and a first alignment layer positioned between the substrate and the liquid crystal layer, and the first alignment layer includes a first layer positioned on the substrate and a second layer positioned between the first layer and the liquid crystal layer. The first layer includes a polyimide which does not include a photoreactive group and the second layer includes a copolymer of a diamine and a dianhydride, and the copolymer includes a repeating unit including a first group derived from the diamine and a second group derived from the dianhydride. Any one of the first group and the second group includes a photoreactive group and the other one of the first group and the second group includes at least one selected from a tert-butyl group, a tert-butoxy group, a tert-butyloxycarbonyl group, and a di-tert-butyloxycarbonyl group.

The repeating unit of the copolymer included in the second layer may include a first repeating unit represented by Formula 1 and a second repeating unit represented by Formula 2.

Chemical Formula 1

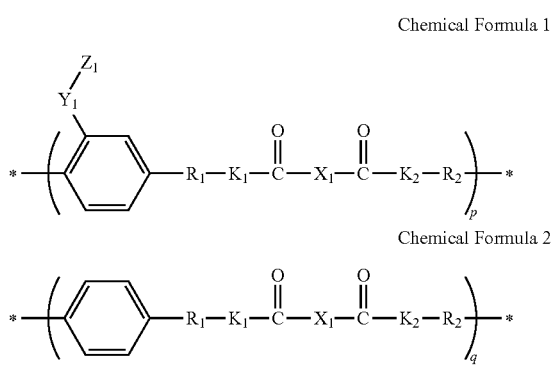

Chemical Formula 2

In Formula 1,
$Y_1$ is $-(CH_2)_n-$, wherein n is 1 to 20,
$Z_1$ is a group selected from

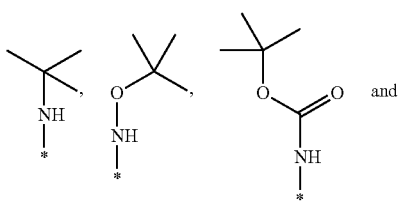
and

-continued

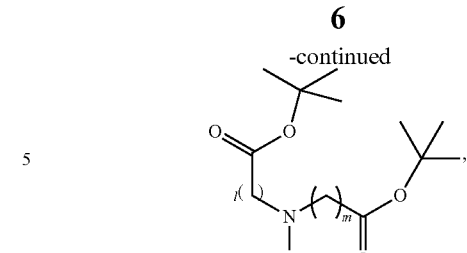

wherein m and 1 are each independently an integer ranging from 1 to 4, and
in Formula 1 and Formula 2,
$K_1$ and $K_2$ are each independently a single bond, an oxygen atom or $-NH-$;
$X_1$ is

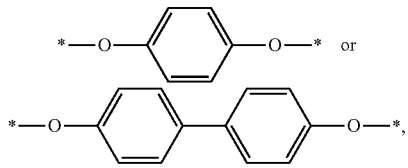

$R_1$ and $R_2$ are each independently

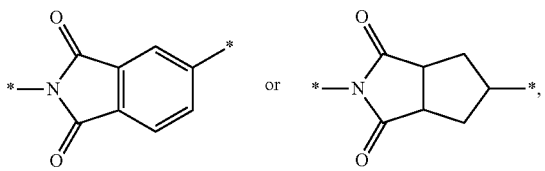

* indicates a point of attachment bonded to $-K_1-C(=O)-$ or $-K_2-C(=O)-$, and
p and q are each independently an integer ranging from 10 to 2,000.

In the second layer, an amount of the first repeating unit may be 3 weight percent to 15 weight percent based on a total 100 weight percent of the repeating unit.

In Formula 1 and Formula 2,

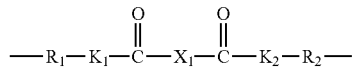

may be each independently

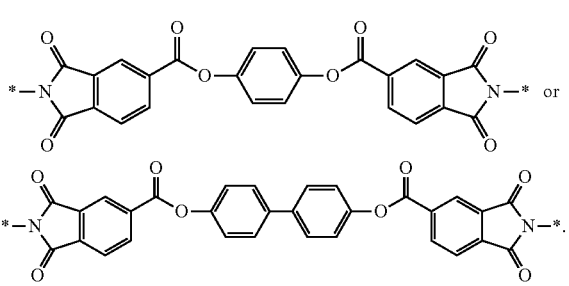

The repeating unit of the copolymer included in the second layer may include a third repeating unit represented by Formula 3 and a fourth repeating unit represented by Formula 4.

Chemical Formula 3

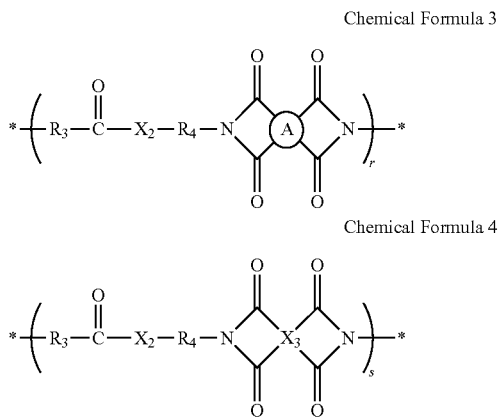

Chemical Formula 4

In Formulae 3 and 4, $X_2$ is a sulfur atom, an oxygen atom or —NH—, at least one side of the $R_3$ and $R_4$ includes an aromatic ring and at least one point of attachment of —C(=O)—$X_2$— is bonded to the aromatic ring, and in Formula 3,

is a group selected from

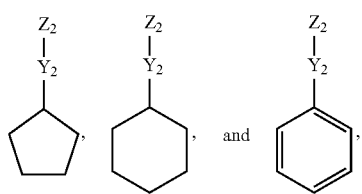

$Y_2$ is —$(CH_2)_n$—, wherein n is 1 to 20,
$Z_2$ is a group selected from

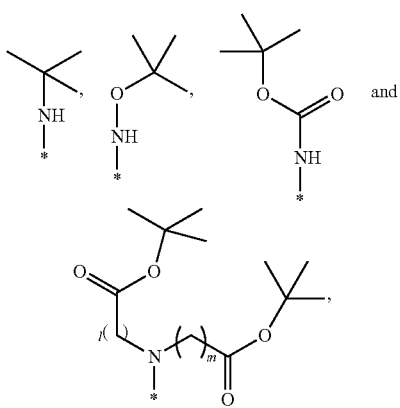

wherein m and l are each independently an integer ranging from 1 to 4, and in Formula 4, $X_3$ is a tetravalent organic group derived from an alicyclic acid dianhydride or an aromatic acid dianhydride, and r and s are each independently an integer ranging from 10 to 2,000.

In the second layer, an amount of the third repeating unit may be 3 weight percent to 15 weight percent based on a total 100 weight percent of the repeating unit.

In Formula 3 and Formula 4,

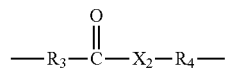

may be each independently one selected from

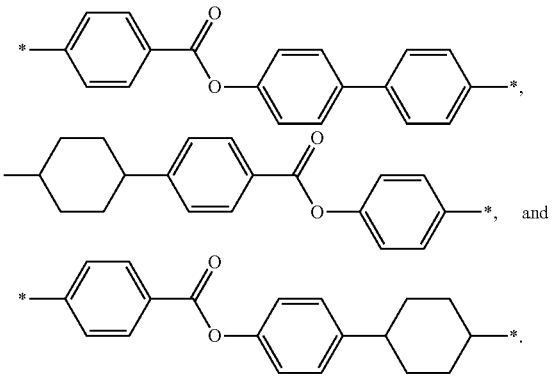

The liquid crystal display (LCD) may further include a first electrode positioned between the first substrate and the first alignment layer.

The liquid crystal display (LCD) may further include a second electrode positioned between the first electrode and the substrate and insulated from the first electrode.

According to the exemplary embodiments, there are provided a photo alignment agent and a liquid crystal display (LCD) in which an after-image is minimized.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
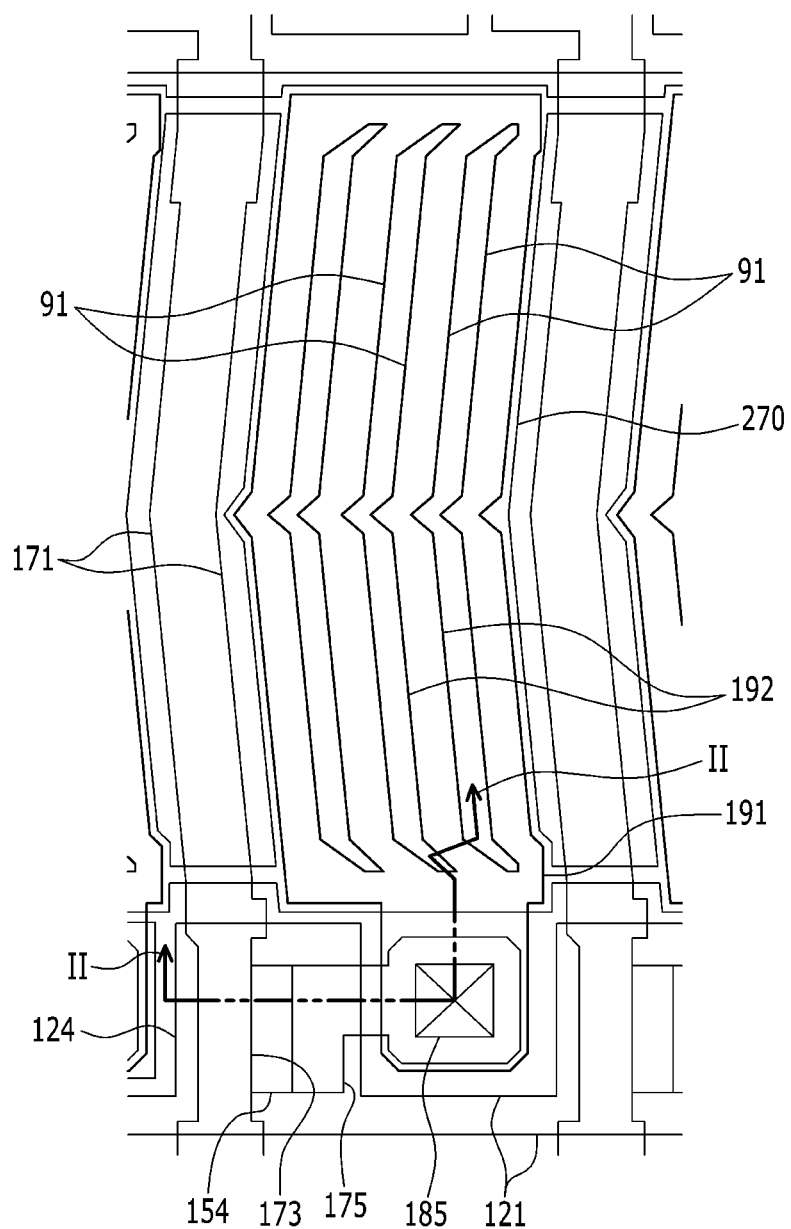
FIG. 1 is a top plan view illustrating a liquid crystal display (LCD) according to an exemplary embodiment of the present disclosure.

Hereinafter, exemplary embodiments of the present disclosure will be described in detail with reference to the accompanying drawings so that the present disclosure may be readily implemented by a person of an ordinary skill in the art. The present disclosure is not limited to the exemplary embodiments but can be embodied in various other ways.

Parts irrelevant to the description are omitted for the simplicity of explanation, and through the whole specification, identical or similar constituent elements will be assigned identical reference numerals.

Further, since the size and thickness of each component illustrated in the drawings are represented for better understanding and ease of description, the present disclosure is not necessarily limited thereto. In the drawings, the thickness of layers, films, panels, regions, etc. are exaggerated for clarity. Further, in the drawings, the thickness of some layers, films, panels, regions, etc. are exaggerated for better understanding and ease of description.

Furthermore, it will be understood that when an element such as a layer, film, region, or substrate is referred to as being "on" another element, it can be directly on the other element or intervening elements may also be present. In contrast, when an element is referred to as being "directly on" another element, there are no intervening elements present. Also, when an element is referred to as being "above" or "on" a reference element, the element is positioned above or below the reference element but is not necessarily positioned "above" or "on" the reference element in the opposite direction to gravity.

In addition, unless explicitly described to the contrary, the word "comprise" and variations such as "comprises" or "comprising" will be understood to imply the inclusion of stated elements but not the exclusion of any other elements.

Further, through the whole specification, the term "planar" refers to a target portion when viewed from the top and the term "cross-sectional" refers to a cross section vertically cutting a target portion when viewed from the side.

A photo alignment agent according to an exemplary embodiment includes a copolymer of a diamine and a dianhydride, wherein the copolymer includes a repeating unit including a first group derived from the diamine and a second group derived from the dianhydride, wherein any one of the first group and the second group includes a photoreactive group and the other one of the first group and the second group includes at least one selected from a tert-butyl group, a tert-butoxy group, a tert-butyloxycarbonyl group, and a di-tert-butyloxycarbonyl group.

That is, if the diamine includes a photoreactive group, the dianhydride does not include a photoreactive group but includes a tert-butyl group, a tert-butoxy group, a tert-butyloxycarbonyl group, or a di-tert-butyloxycarbonyl group. On the other hand, if the dianhydride includes a photoreactive group, the diamine does not include a photoreactive group but includes a tert-butyl group, a tert-butoxy group, a tert-butyloxycarbonyl group, or a di-tert-butyloxycarbonyl group. That is, a photoreactive group and a tert-butyl group or the like are respectively bonded to the diamine and the dianhydride which are repeating units included in the photo alignment agent, so that the photo alignment agent has excellent delamination characteristics and photo alignment characteristics.

The photo alignment agent according to an exemplary embodiment includes a first repeating unit represented by the following Formula 1 and a second repeating unit represented by the following Formula 2.

Chemical Formula 1

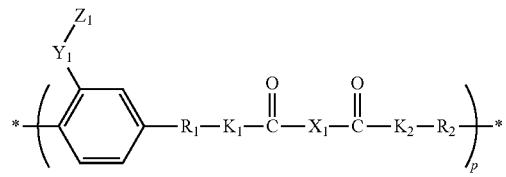

Chemical Formula 2

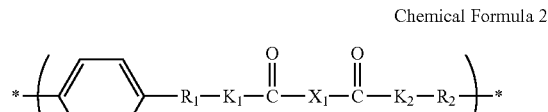

In the above Formula 1,
$Y_1$ is $-(CH_2)_n-$, wherein n is 1 to 20,
$Z_1$ is a group selected from

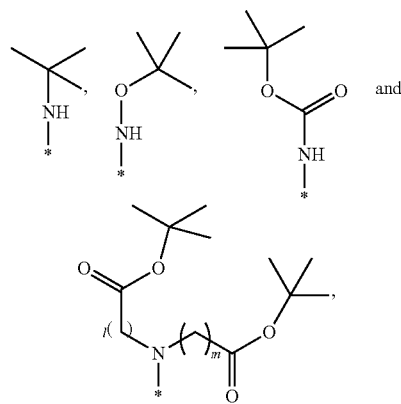

wherein
m and l are each independently an integer ranging from 1 to 4, and
in the above Formula 1 and Formula 2,
$K_1$ and $K_2$ are each independently a single bond, an oxygen atom or $-NH-$;
$X_1$ is

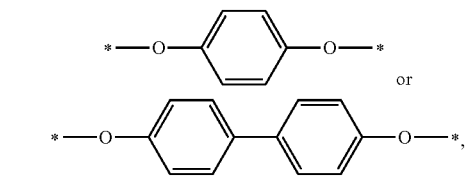

$R_1$ and $R_2$ are each independently

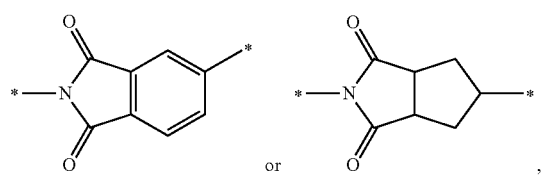

* indicates a point of attachment bonded to $-K_1-C(=O)-$ or $-K_2-C(=O)-$, and p and q are each independently an integer ranging from 10 to 2,000.

X₁ may include at least one aromatic ring, wherein the aromatic ring is connected through a hydrocarbon chain. The hydrocarbon chain may include —O— at a position adjacent to a carbon-carbon bond or a carbon atom. Further, X₁ may not include an aromatic ring but may include a hydrocarbon chain partially substituted with oxygen or fluorine. Furthermore, X₁ may include a —NH— group in its structure.

X₁ may be a group selected from

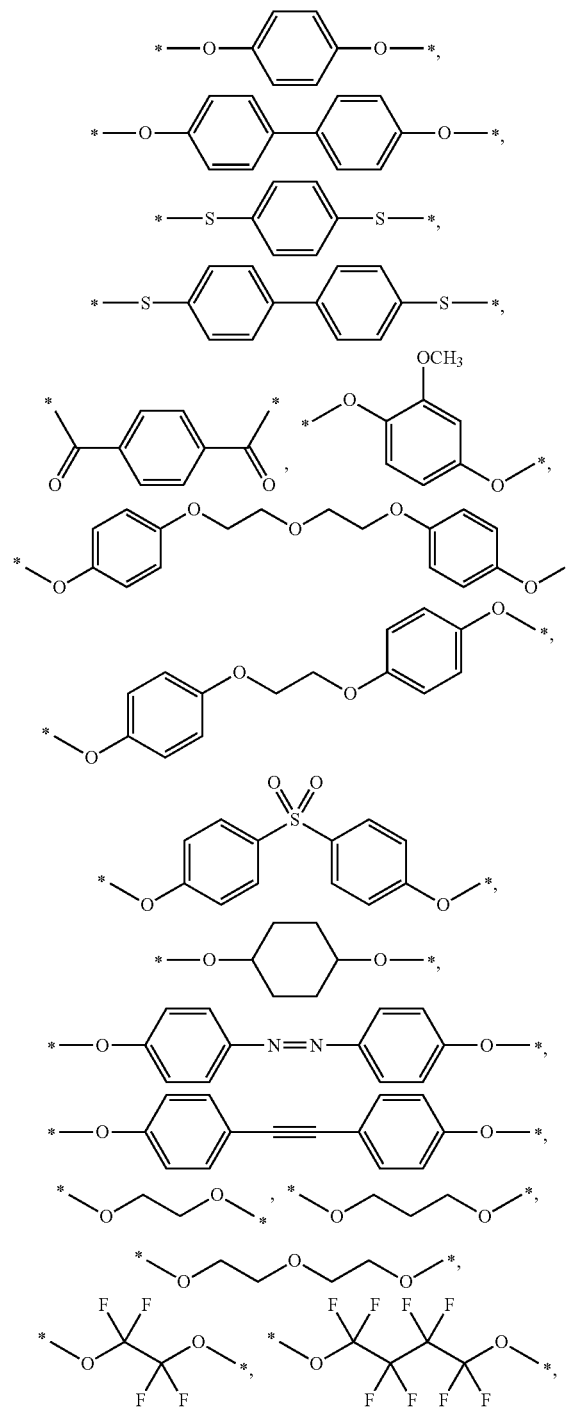

Referring to Chemical Formula 1, the photo alignment agent according to an exemplary embodiment has a polyimide structure including the diamine and the dianhydride. Herein, a photoreactive group (C(=O)—K₁) is included in the dianhydride, but the photoreactive group is not included in the diamine.

The photoreactive group included in the dianhydride of Chemical Formula 1 causes a photo realignment reaction when a light is irradiated, and aligns an alignment layer without decomposition of chemical formula.

The diamine of Chemical Formula 1 includes at least one functional group selected from a tert-butyl group, a tert-butoxy group, a tert-butyloxycarbonyl group, and a di-tert-butyloxycarbonyl group. In the following, the above-described four functional groups will be referred to as tert-butyl-containing functional groups.

The tert-butyl-containing functional groups facilitate delamination during delamination of an alignment agent including a photo alignment agent and a general alignment agent when an alignment layer is prepared. This is because a tert-butyl-containing functional group is bonded to the diamine and the photo alignment agent has non-polar characteristics.

That is, a tert-butyl-containing functional group is bonded to the diamine, so that a polar difference from a general alignment agent is increased, and a photo alignment layer which is relatively non-polar is moved to a surface of an alignment layer and a general alignment layer which is polar is moved to a lower side of the alignment layer.

In order to suppress deterioration of photo reactivity, a tert-butyl-containing functional group is bonded to the diamine which is not bonded to a photoreactive group, in Chemical Formula 1. That is, in the repeating unit of Chemical Formula 1, a photoreactive group is bonded to the dianhydride and a tert-butyl-containing functional group is bonded to the diamine, so that a delamination characteristics of the alignment layer can be improved without deterioration of photo reactivity.

In the photo alignment agent according to an exemplary embodiment, an amount of the first repeating unit may be 3 weight percent (wt %) to 15 wt %. That is, an amount of the first repeating unit with respect to the sum of the amount of the first repeating unit and an amount of the second repeating unit may be from 3 wt % to 15 wt %.

This means that the diamine bonded to a tert-butyl-containing functional group accounts for 3 wt % to 15 wt % of the entire photo alignment agent. If the content of the first repeating unit represented by the above Formula 1 is higher than 15 wt %, photo reactivity of the photo alignment agent may deteriorate. Further, if the content of the first repeating unit represented by the above Formula 1 is lower than 3 wt %, the photo alignment agent may not have sufficient delamination characteristics.

In the above Formula 1 and Formula 2, each

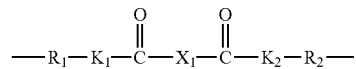

may be a group selected from the following Formulae a-1 to a-37.

(a-1)
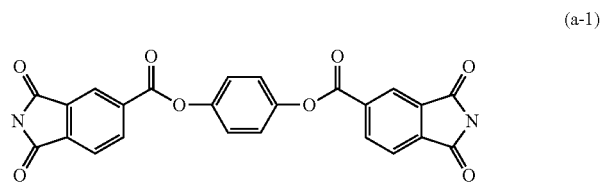

(a-2)
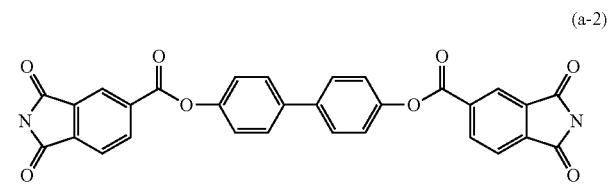

(a-3)
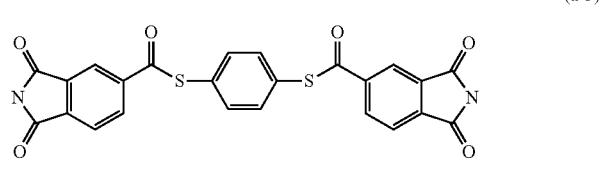

(a-4)
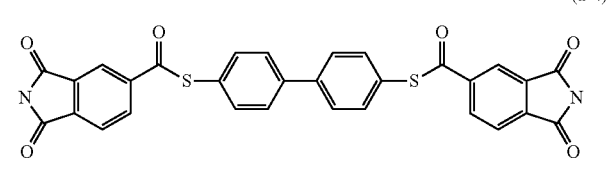

(a-5)
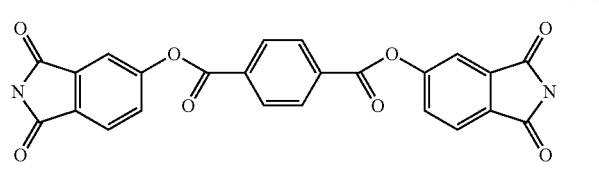

(a-6)
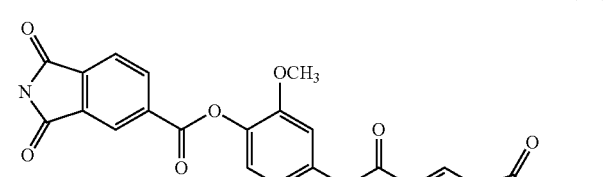

(a-7)
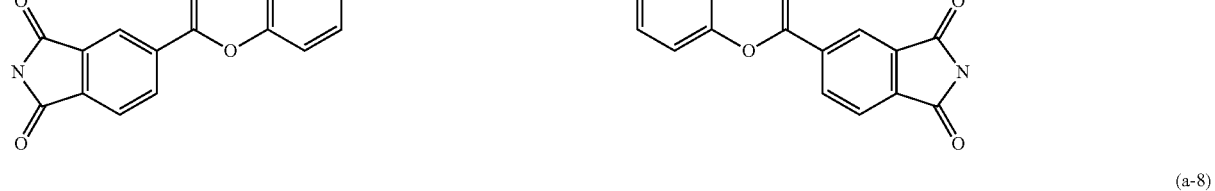

(a-8)
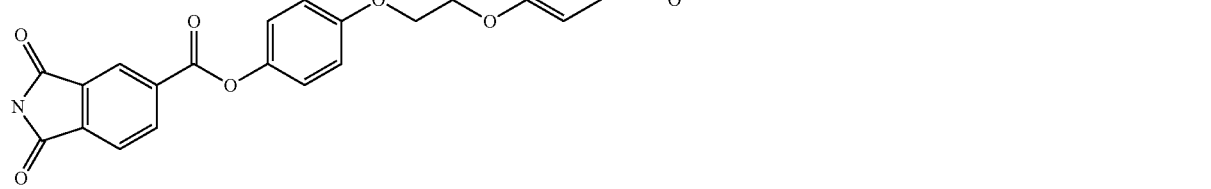

(a-9)
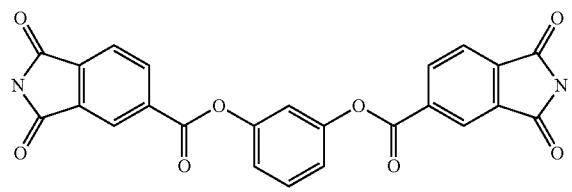
(a-10)
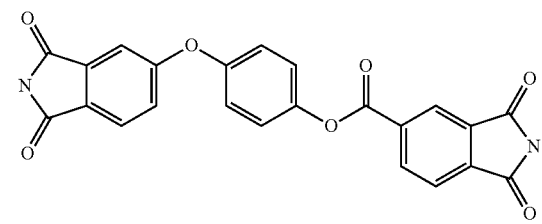
(a-11)
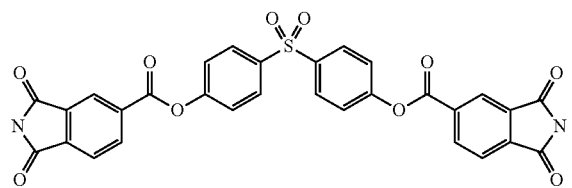
(a-12)
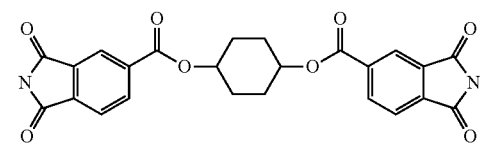
(a-13)
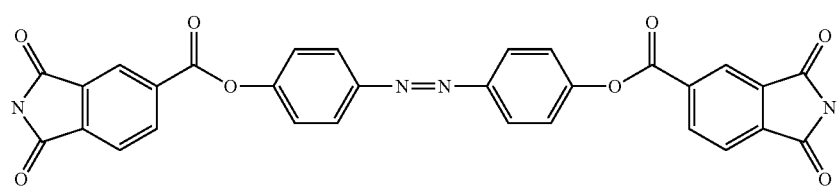
(a-14)
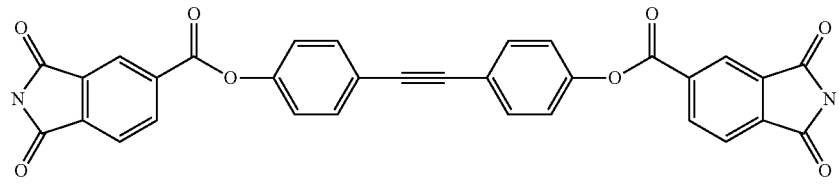
(a-15)
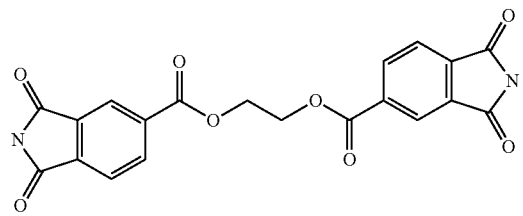
(a-16)
(a-17)
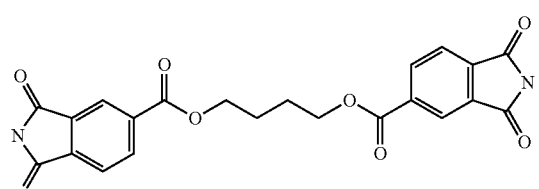
(a-18)
(a-19)
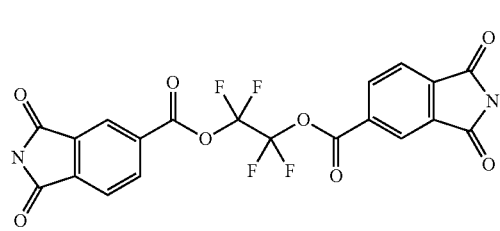
(a-20)
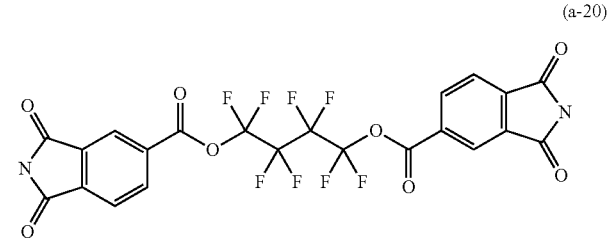

-continued
(a-21)
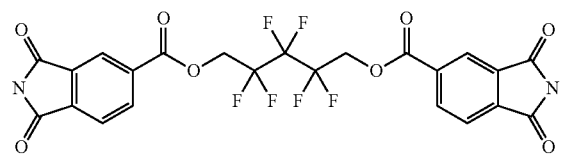
(a-22)
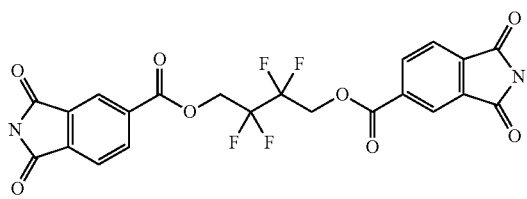
(a-23)
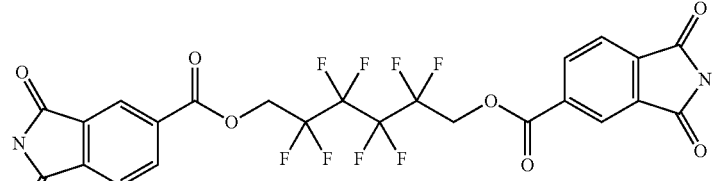
(a-24)
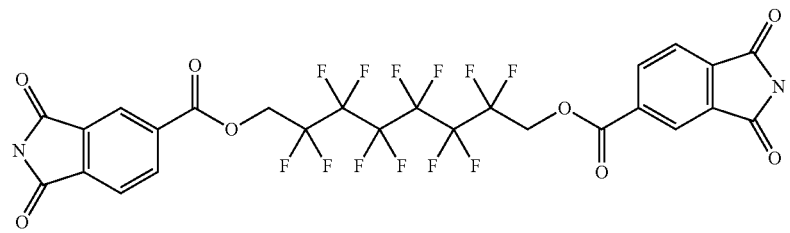
(a-25)
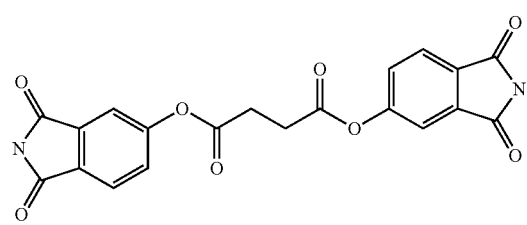
(a-26)
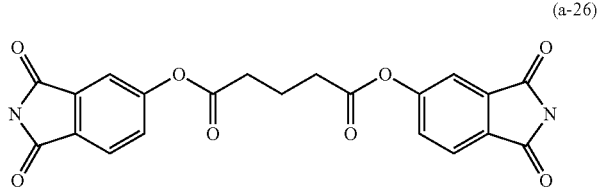
(a-27)
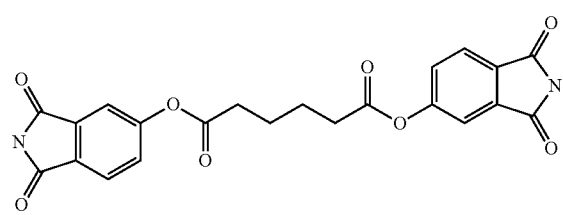
(a-28)
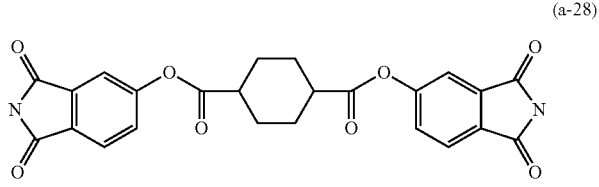
(a-29)
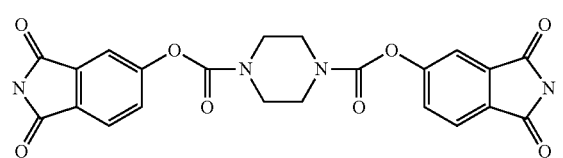
(a-30)
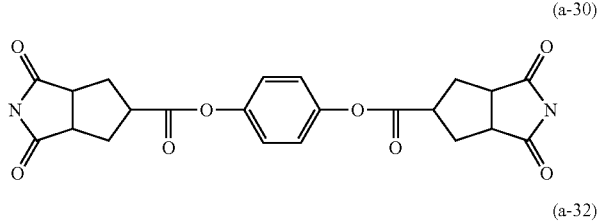
(a-31)
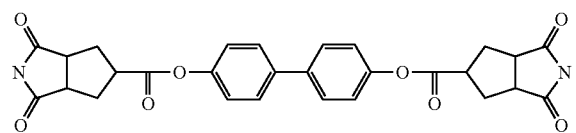
(a-32)
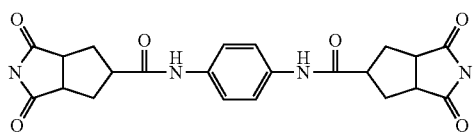

-continued

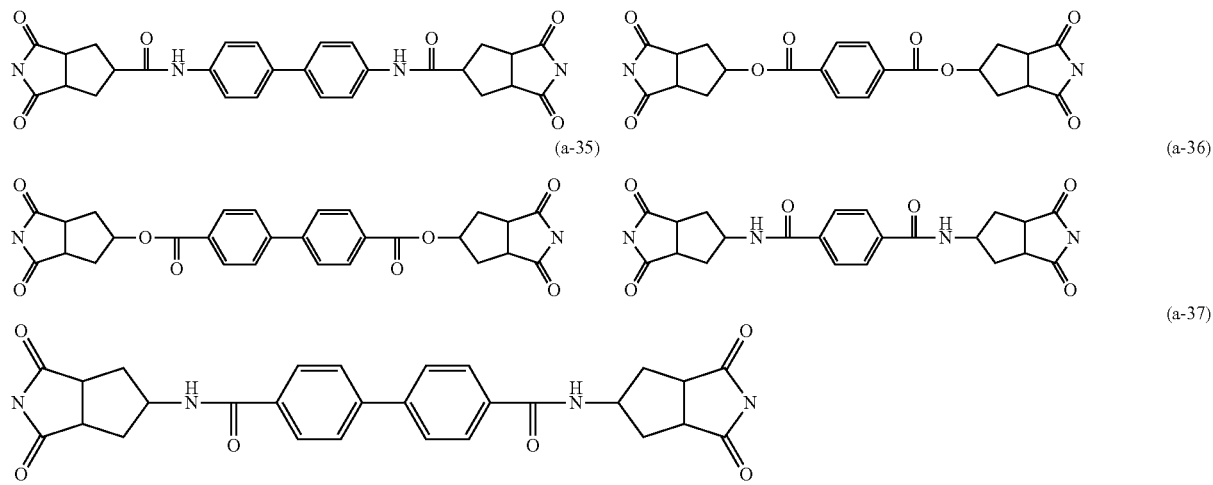

The photo alignment agent including the repeating unit in which a tert-butyl-containing functional group is bonded to the diamine and a photoreactive group is positioned in the dianhydride has been described.

However, when a photoreactive group is positioned in the diamine and a tert-butyl-containing functional group is bonded to the dianhydride also represents an exemplary embodiment of the present disclosure.

Hereinafter, a photo alignment agent including a repeating unit in which a photoreactive group is positioned in the diamine and a tert-butyl-containing functional group is bonded to the dianhydride will be described.

A photo alignment agent according to an exemplary embodiment includes a third repeating unit represented by Chemical Formula 3 and a fourth repeating unit represented by Chemical Formula 4.

Chemical Formula 3

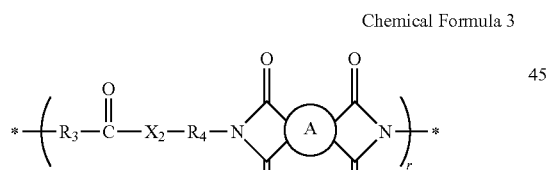

Chemical formula 4

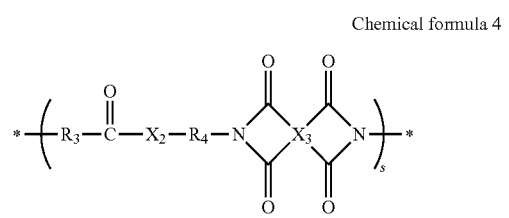

In the above Formulae 3 and 4, $X_2$ is a sulfur atom, an oxygen atom or —NH—, at least one side of the $R_3$ and $R_4$ includes an aromatic ring and at least one point of attachment of —C(=O)—$X_2$— is bonded to the aromatic ring, and in Formula 3,

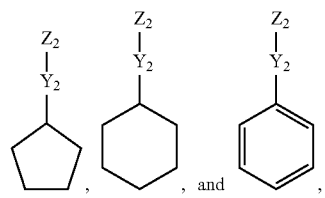

is one selected from

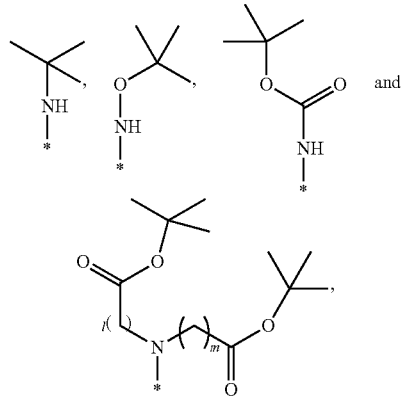

$Y_2$ is —(CH$_2$)$_n$—, wherein n is 1 to 20,
$Z_2$ is a group selected from wherein m and 1 are each independently an integer ranging from 1 to 4.

In the above Formula 4, $X_3$ is a tetravalent organic group derived from an alicyclic acid dianhydride or an aromatic acid dianhydride.

Variables r and s are each independently an integer ranging from 10 to 2,000.

Referring to Chemical Formula 3, the photo alignment agent according to an exemplary embodiment has a polyimide structure including the diamine and the dianhydride. Herein, a photoreactive group (C(=O)—X$_2$) is included in the diamine, but the photoreactive group is not included in the dianhydride.

The photoreactive group included in the diamine of Chemical Formula 3 causes a photo realignment reaction when a light is irradiated, and aligns an alignment layer without decomposition of the compound.

The dianhydride of Chemical Formula 1 includes one of

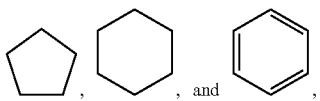

and is connected with at least one functional group selected from a tert-butyl group, a tert-butoxy group, a tert-butyloxycarbonyl group, and a di-tert-butyloxycarbonyl group.

The tert-butyl-containing functional groups facilitate delamination during delamination of an alignment agent including a photo alignment agent and a general alignment agent when an alignment layer is prepared. This is because a tert-butyl-containing functional group is bonded to the dianhydride and the photo alignment agent has non-polar characteristics.

That is, a tert-butyl-containing functional group is bonded to the dianhydride, so that a polarity difference from a general alignment agent is increased, and a photo alignment layer which is relatively non-polar is moved to a surface of an alignment layer and a general alignment layer which is polar is moved to a lower side of the alignment layer.

In order to suppress deterioration of photo reactivity, a tert-butyl-containing functional group is bonded to the dianhydride which is not bonded to a photoreactive group, as in Chemical Formula 3. That is, in the repeating unit of Chemical Formula 3, a photoreactive group is bonded to the diamine and a tert-butyl-containing functional group is bonded to the dianhydride, so that a delamination characteristics of the alignment layer can be improved without deterioration of photo reactivity.

In the photo alignment agent according to an exemplary embodiment, an amount of the third repeating unit may be 3 wt % to 15 wt %. That is, an amount of the third repeating unit with respect to the sum of the amount of the third repeating unit and an amount of the fourth repeating unit may be from 3 wt % to 15 wt %.

This means that a content of a diamine bonded to a tert-butyl-containing functional group is from 3 wt % to 15 wt % of the entire photo alignment agent. If the content of the third repeating unit represented by the above Formula 3 is higher than 15 wt %, photo reactivity of the photo alignment agent may deteriorate. Further, if the content of the third repeating unit represented by the above Formula 3 is lower than 3 wt %, the photo alignment agent may not have sufficient delamination characteristics.

In the above Formula 3 and Formula 4, each

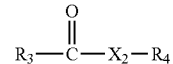

may be a group selected from the following Formulae b-1 to b-42.

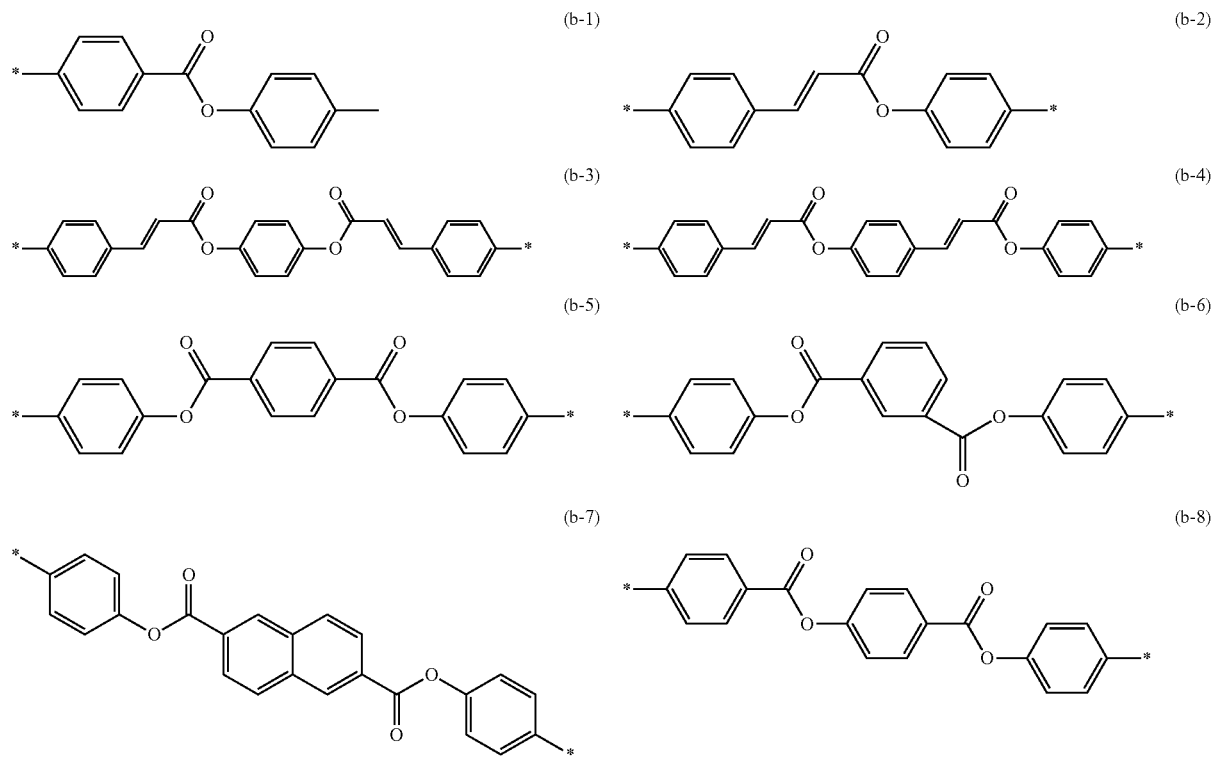

(b-9)
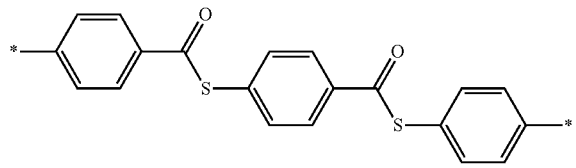
(b-10)
(b-11)
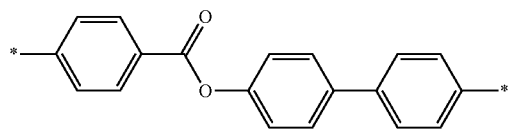
(b-12)
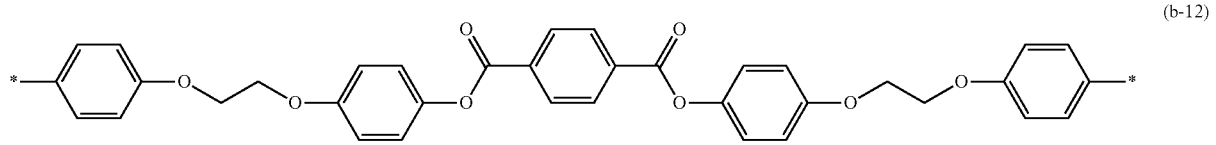
(b-13)
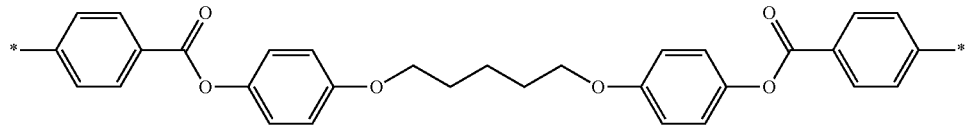
(b-14)
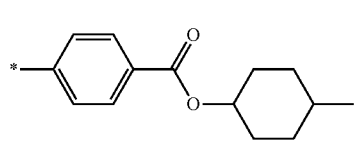
(b-15)
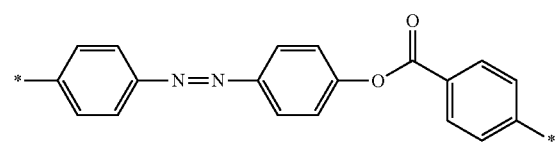
(b-16)
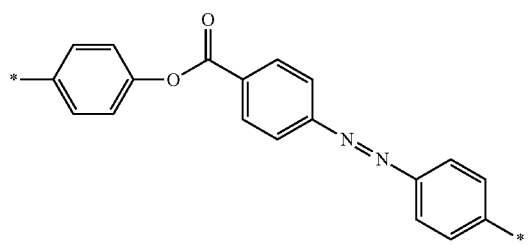
(b-17)
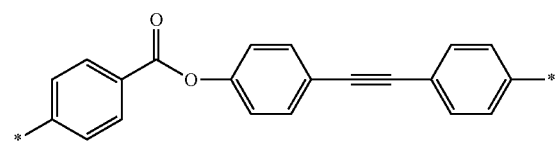
(b-18)
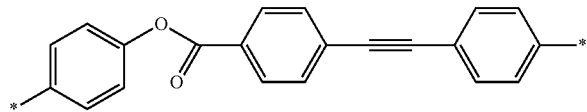
(b-19)
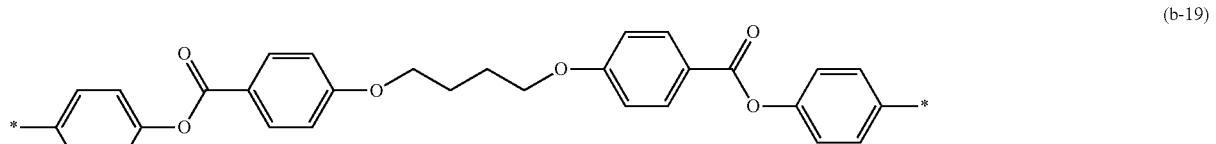
(b-20)
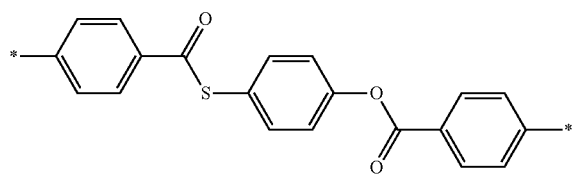
(b-21)
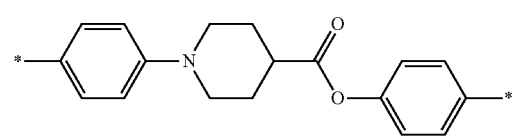

(b-22)
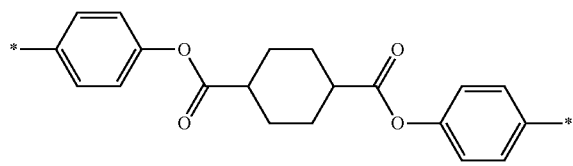
(b-23)
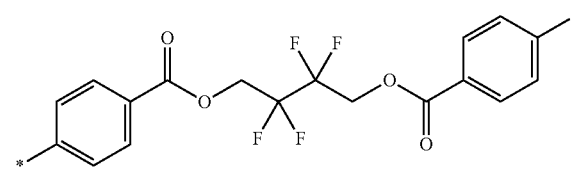
(b-24)
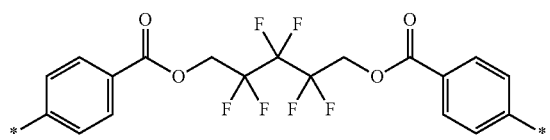
(b-25)
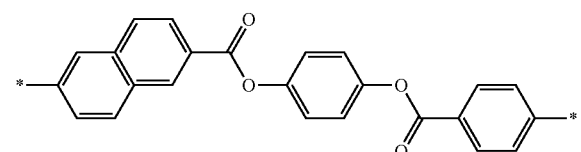
(b-26)
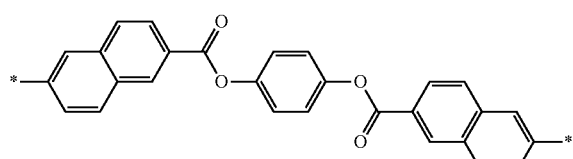
(b-27)
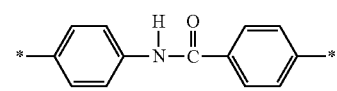
(b-28)
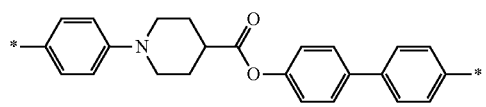
(b-29)
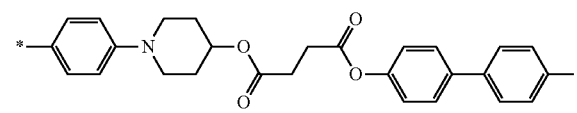
(b-30)
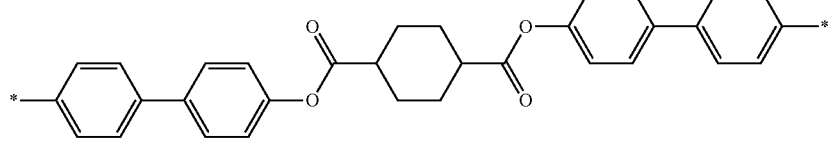
(b-31)
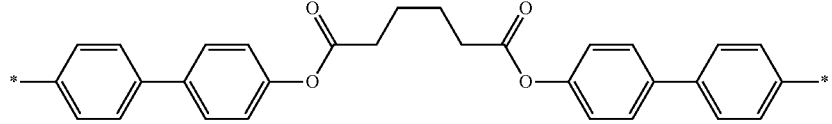
(b-32)
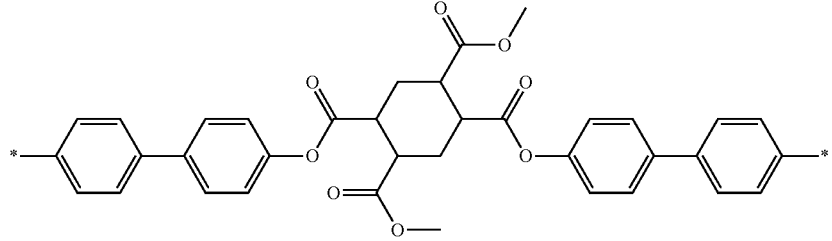
(b-33)
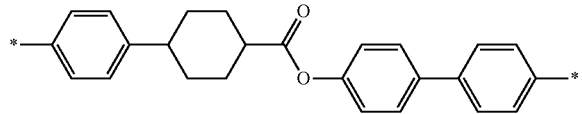
(b-34)
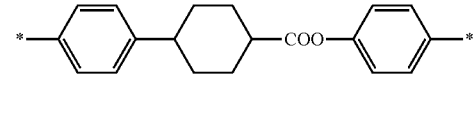
(b-35)
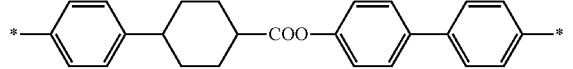
(b-36)
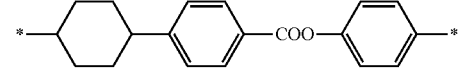

-continued

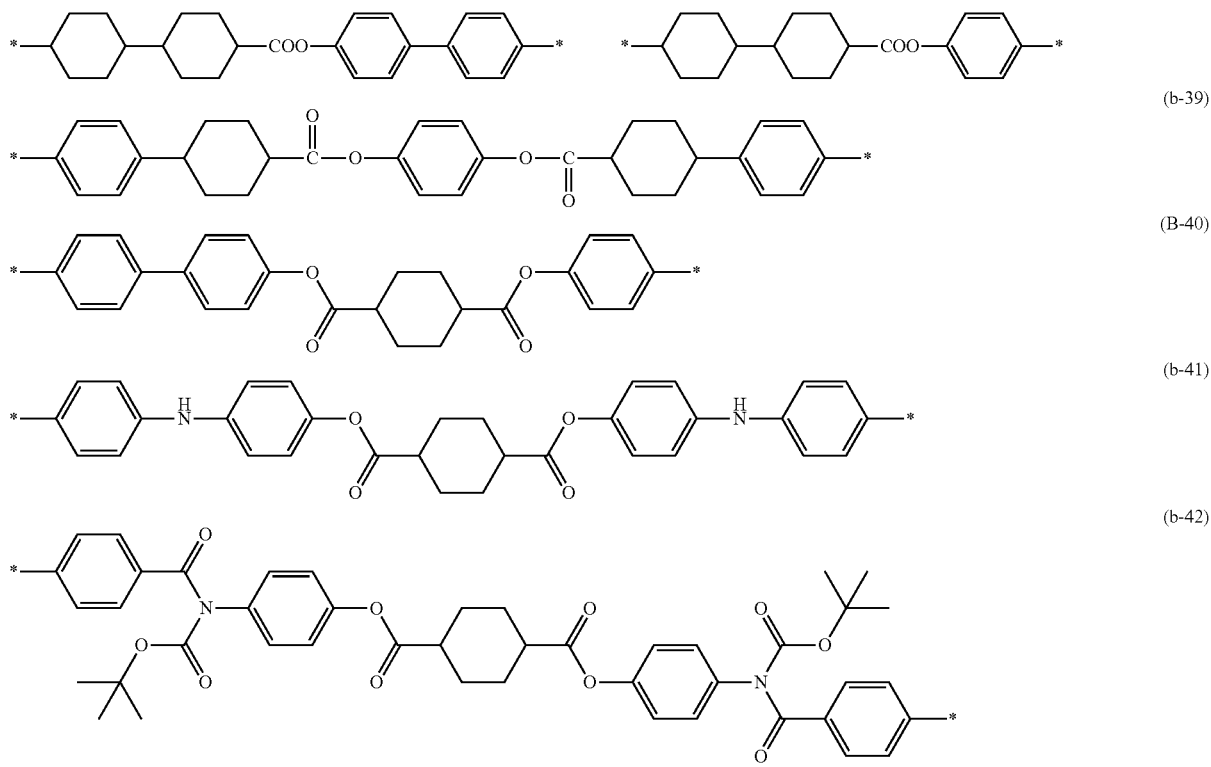

Hereinafter, an alignment layer according to an exemplary embodiment will be described. The alignment layer according to an exemplary embodiment includes a first layer and a second layer, wherein the first layer includes a polyimide which does not include a photoreactive group. Herein, the second layer includes a copolymer of a diamine and a dianhydride, wherein the copolymer includes a repeating unit including a first group derived from the diamine and a second group derived from the dianhydride, and wherein any one of the first group and the second group includes a photoreactive group and the other one of the first group and the second group includes at least one selected from a tert-butyl group, a tert-butoxy group, a tert-butyloxycarbonyl group, and a di-tert-butyloxycarbonyl group.

If the diamine includes a photoreactive group, the dianhydride may not include a photoreactive group but may include a tert-butyl group, a tert-butoxy group, a tert-butyloxycarbonyl group, or a di-tert-butyloxycarbonyl group. On the other hand, if the dianhydride includes a photoreactive group, the diamine may not include a photoreactive group but may include a tert-butyl group, a tert-butoxy group, a tert-butyloxycarbonyl group, or a di-tert-butyloxycarbonyl group.

The repeating unit of the copolymer included in the second layer of the alignment layer according to an exemplary embodiment may include a first repeating unit represented by the following Formula 1 and a second repeating unit represented by the following Formula 2.

Chemical Formula 1

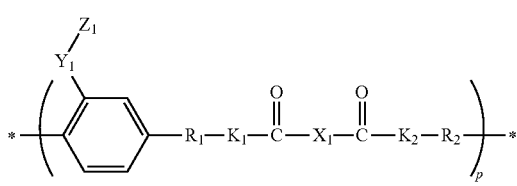

Chemical Formula 2

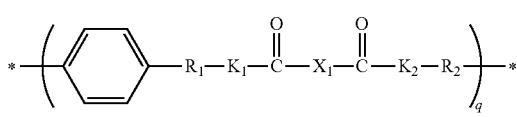

In the above Formula 1, $Y_1$ is —$(CH_2)_n$—, wherein n is 1 to 20, $Z_1$ is a group selected from

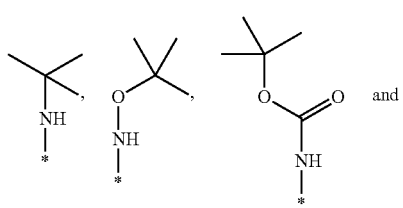

-continued

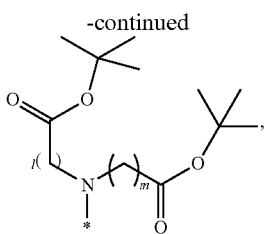

and m and 1 are each independently an integer ranging from 1 to 4, and in the above Formula 1 and Formula 2, $K_1$ and $K_2$ are each independently a single bond, an oxygen atom or —NH—;

$X_1$ is

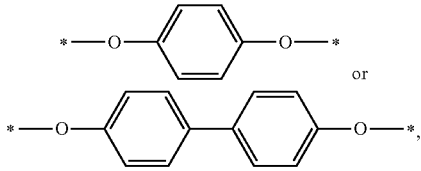

$R_1$ and $R_2$ are each independently

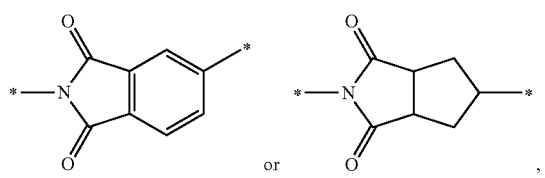

* indicates a point of attachment bonded to —$K_1$—C(=O)— or —$K_2$—C(=O)—, and p and q are each independently an integer ranging from 10 to 2,000.

In the second layer of the alignment layer, an amount of the first repeating unit may be 3 wt % to 15 wt % based on a total 100 weight percent of the repeating unit.

In the above Formula 1 and Formula 2, each

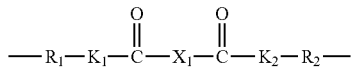

may be a group selected from the above Formulae a-1 to a-37.

The first layer of the alignment layer according to an exemplary embodiment includes a polyimide which does not include a photoreactive group and a tert-butyl functional group, and the second layer includes a repeating unit of Chemical Formula 1 including a photoreactive group and a tert-butyl functional group. The repeating unit of Chemical Formula 1 including a tert-butyl functional group is non-polar, and a polyimide which does not include a photoreactive group and a tert-butyl functional group is polar. Therefore, due to a difference in polarity, delamination occurs in the alignment layer. Herein, a polyimide which is polar is delaminated as a lower layer proximate to a substrate and the repeating unit of Chemical Formula 1 which is non-polar is delaminated as an upper layer proximate to a liquid crystal layer.

Since the alignment layer according to an exemplary embodiment includes a tert-butyl-containing functional group in the diamine, it has excellent non-polar characteristics. Therefore, delamination readily occurs. When delamination readily occurs as such, a remarkable improvement of AC after-image and DC after-image can be seen.

Further, the repeating unit of the copolymer included in the second layer of the alignment layer according to an exemplary embodiment may include a third repeating unit represented by the following Formula 3 and a fourth repeating unit represented by the following Formula 4.

Chemical Formula 3

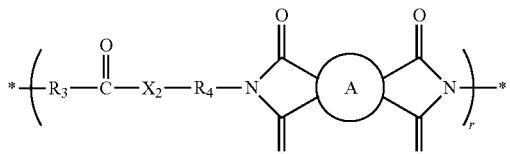

Chemical Formula 4

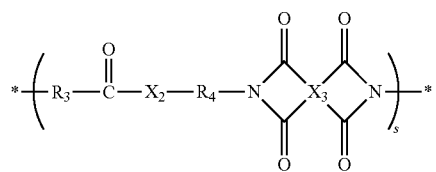

In the above Formulae 3 and 4, $X_2$ is a sulfur atom, an oxygen atom or —NH—, at least one side of the $R_3$ and $R_4$ includes an aromatic ring, and at least one point of attachment of —C(=O)—$X_2$— is bonded to the aromatic ring, and in the above Formula 3,

is a group selected from

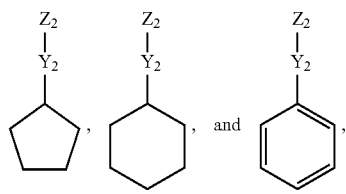

$Y_2$ is —$(CH_2)_n$—, wherein n is 1 to 20, $Z_2$ is a group selected from

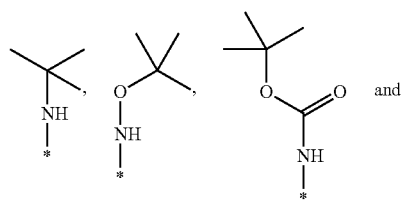

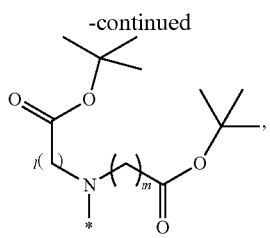

wherein m and l are each independently an integer ranging from 1 to 4.

In the above Formula 4, $X_3$ is a tetravalent organic group derived from an alicyclic acid dianhydride or an aromatic acid dianhydride, and r and s are each independently an integer ranging from 10 to 2,000.

In the second layer of the alignment layer, an amount of the third repeating unit may be 3 wt % to 15 wt % based on a total 100 weight percent of the repeating unit.

The first layer of the alignment layer according to an exemplary embodiment includes a polyimide which does not include a photoreactive group and a tert-butyl functional group, and the second layer includes a repeating unit of Chemical Formula 3 including a photoreactive group and a tert-butyl functional group.

The repeating unit of Chemical Formula 3 including a tert-butyl functional group is non-polar, and a polyimide which does not include a photoreactive group and a tert-butyl functional group is polar. Therefore, due to a difference in polarity, delamination occurs in the alignment layer. Herein, a polyimide which is polar is delaminated as a lower layer proximate to a substrate and the repeating unit of Chemical Formula 3 which is non-polar is delaminated as an upper layer proximate to a liquid crystal layer.

Since the alignment layer according to an exemplary embodiment includes a tert-butyl-containing functional group in the diamine, it has excellent non-polar characteristics. Therefore, delamination readily occurs. When delamination readily occurs as such, a remarkable improvement of AC after-image and DC after-image can be seen.

Hereinafter, effects of the alignment layer according to an exemplary embodiment will be described.

Table 1 shows the composition of each material of an alignment layer according to each of Comparative Examples and Examples.

TABLE 1

|  | Comparative Example 1 | Comparative Example 2 | Example 1 | Example 2 | Example 3 |
|---|---|---|---|---|---|
| Upper alignment layer | | | | | |
| Dianhydride (Photoreactive group) | 50% | 50% | 50% | 50% | 50% |
| Diamine (including tert-butyl-containing functional group) | 0% | 0% | 5% | 10% | 20% |
| Diamine (General) | 50% | 50% | 45% | 40% | 30% |
| Lower alignment layer | | | | | |
|  | None | \multicolumn{4}{c}{Photoreactive group-free general alignment layer} | | | |

Table 2 shows results of the evaluation of the characteristics of an alignment layer according to each of Comparative Examples and Examples. The measured characteristics include AC after-image, black luminance, r-DC, and delamination characteristics.

TABLE 2

| Evaluation result | Comparative Example 1 | Comparative Example 2 | Example 1 | Example 2 | Example 3 |
|---|---|---|---|---|---|
| AC after-image (Luminance increase rate) | 3% | 5.50% | 3.50% | 3% | Occurrence of precipitation |
| Black luminance | 1.5 cd | 2 cd | 1.5 cd | 1.5 cd | |
| r-DC | 2 V | 1.2 V | 1.2 V | 1.1 V | |
| Delamination characteristic | 100% | 50% | 73% | 80% | |

Referring to the above Table 1 and Table 2, it was determined that when a diamine including a non-polar group, i.e., a tert-butyl group is included in certain appropriate amounts (Examples 1 and 2), an AC after-image was remarkably improved, as compared with Comparative Example 2, where a diamine without a tert-butyl group is included. Further, when the degree of delamination of a lower alignment layer (which is a general alignment layer) and an upper alignment layer (which is a photo alignment layer) was measured, it was determined that the delamination characteristics of the alignment layers according to Examples 1 and 2 were excellent. Furthermore, the black luminance and r-DC in Examples 1 and 2 were also excellent. Herein, r-DC indicates a residual DC voltage, and as a value thereof is increased, a DC after-image is increased. Referring to the above Table 2, it can be seen that in the alignment layer according to an exemplary embodiment, a DC after-image is improved. Typically, an AC after-image and a DC after-image are complementary to each other. Despite the difficulty in decreasing both of them, the alignment layer according to an exemplary embodiment improves both an AC after-image and a DC after-image. However, in a case where diamine including a tert-butyl group is contained in an amount of 20 weight percent (wt %) or more, precipitation occurs without dissolution.

Hereinafter, a liquid crystal display (LCD) according to an exemplary embodiment will be described.

Figure 2:
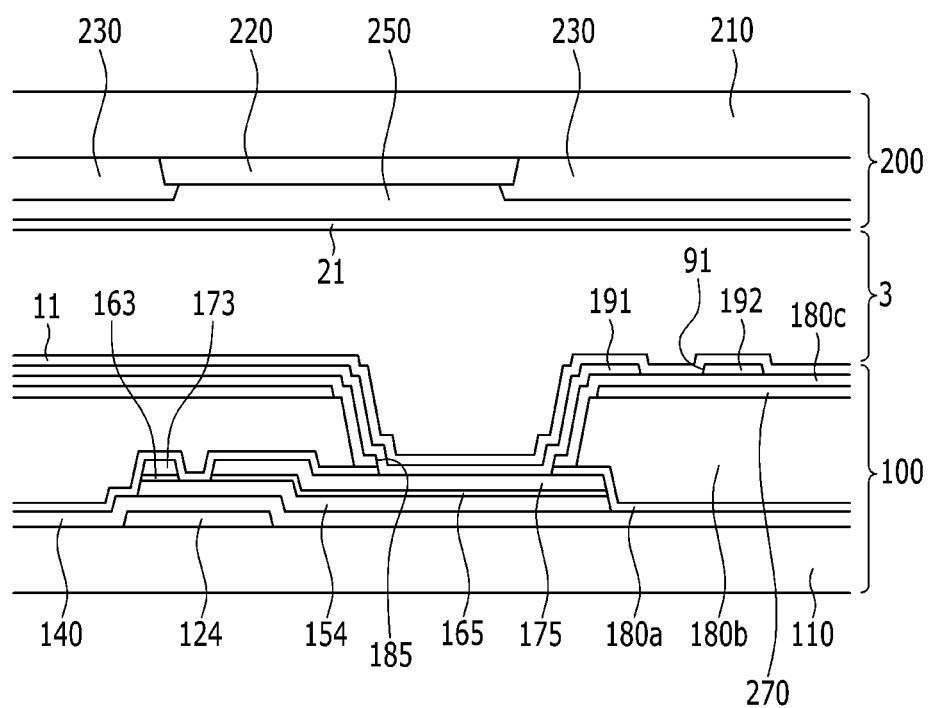
FIG. 2 is a cross-sectional view taken along a cutting line II-II of FIG. 1.

FIG. 1 is a top plan view illustrating a liquid crystal display (LCD) according to an exemplary embodiment of the present disclosure. FIG. 2 is a cross-sectional view taken along a cutting line II-II of FIG. 1.

Referring to FIG. 1 and FIG. 2, a liquid crystal display (LCD) according to the present exemplary embodiment includes a first display panel 100 and a second display panel 200 facing each other and a liquid crystal layer 3 injected therebetween.

Firstly, the first display panel 100 will be described.

A gate conductor including a gate line 121 and a gate electrode 124 is positioned on a substrate 110 including transparent glass or plastic. The gate line 121 may include aluminum (Al), silver (Ag), copper (Cu), molybdenum (Mo), chromium (Cr), tantalum (Ta) and titanium (Ti) or an alloy thereof, and may have a multilayer structure including different materials. The substrate 110 will be described below as a first substrate 110 so as to correspond to a second substrate 210 which is a counter member to be described later.

A gate insulating layer 140 including silicon nitride ($SiN_x$) or silicon oxide ($SiO_x$) is positioned on the gate line 121.

A semiconductor layer 154 including amorphous silicon or polysilicon is positioned on the gate insulating layer 140. The semiconductor layer 154 may include an oxide semiconductor.

Ohmic contacts 163 and 165 are positioned on the semiconductor layer 154. The ohmic contacts 163 and 165 may include n+ hydrogenated amorphous silicon or silicide doped with n-type impurity at a high concentration.

A data line 171 including a source electrode 173 and a data conductor including a drain electrode 175 are positioned on the ohmic contacts 163 and 165 and the gate insulating layer 140.

The data line 171 is extended mainly in a vertical direction while transferring a data signal and intersects with the gate line 121. Herein, the data line 171 may have a curved portion having a curve shape in order to obtain the maximum transmittance of the liquid crystal display (LCD), and the bent portions may meet each other at an intermediate region of a pixel area and form a V-shape.

The gate electrode 124, the source electrode 173, and the drain electrode 175 form a single thin film transistor TFT together with the semiconductor layer 154, a channel of the thin film transistor is formed at a portion corresponding to the semiconductor layer 154 between the source electrode 173 and the drain electrode 175.

Preferably, the data line 171 and the drain electrode 175 may include a refractory metal such as molybdenum, chromium, tantalum, and titanium, or an alloy thereof.

A first proactive layer 180a is positioned on exposed portions of the data conductors 171, 173, and 175, the gate insulating layer 140, and the semiconductor layer 154. The first protective layer 180a may include an organic insulating material or inorganic insulating material.

A second protective layer 180b is positioned on the first protective layer 180a, and the second protective layer 180b may include an organic insulator.

The second protective layer 180b may be a color filter. If the second protective layer 180b is a color filter, the second protective layer 180b may uniquely display one of primary colors, and examples of the primary colors may include three primary colors including red, green, and blue or yellow, cyan, and magenta.

A common electrode 270 is positioned on the second protective layer 180b.

The common electrodes 270 in adjacent pixels are connected with each other, and thus, may receive a common voltage with a predetermined intensity suppled from the outside of a display area.

An insulating layer 180c is positioned on the common electrode 270. The insulating layer 180c may include an organic insulating material or inorganic insulating material.

A pixel electrode 191 is positioned on the insulating layer 180c. The pixel electrode 191 includes a curved edge which is almost parallel to the curved portion of the data line 171. The pixel electrode 191 includes a plurality of cutouts 91 and a plurality of branched electrodes 192 between the adjacent cutouts 91.

The pixel electrode 191 is a first field generating electrode or first electrode, and the common electrode 270 is a second field generating electrode or second electrode. The pixel electrode 191 and the common electrode 270 may form a fringe field or the like.

The first protective layer 180a, the second protective layer 180b, and the insulating layer 180c include a first contact hole 185 partially overlapped with the drain electrode 175. The pixel electrode 191 is physically and electrically connected with the drain electrode 175 through the contact hole 185 and applied with voltage from the drain electrode 175.

A first alignment layer 11 is formed on the pixel electrode 191 and the insulating layer 180c. The first alignment layer 11 includes a photo alignment layer.

In the present exemplary embodiment, the first alignment layer 11 includes the above-described photo alignment layer according to an exemplary embodiment of the present disclosure. That is, the first alignment layer includes a first layer as a general alignment layer and a second layer as a photo alignment layer, and the first layer includes a polyimide, which does not include a photoreactive group. Herein, the second layer includes a repeating unit in which a diamine and a dianhydride are polymerized, and when the diamine includes a photoreactive group, the dianhydride may not include a photoreactive group but may include a tert-butyl group, a tert-butoxy group, a tert-butyloxycarbonyl group, or a di-tert-butyloxycarbonyl group, or when the dianhydride includes a photoreactive group, the diamine may not include a photoreactive group but may include a tert-butyl group, a tert-butoxy group, a tert-butyloxycarbonyl group, or a di-tert-butyloxycarbonyl group.

That is, the first alignment layer includes the second layer including a first repeating unit represented by Chemical Formula 1 and a second repeating unit represented by Chemical Formula 2 and the first layer including a polyimide which does not include a photoreactive group, and the first layer is positioned closer to the substrate than the second layer.

Chemical Formula 1

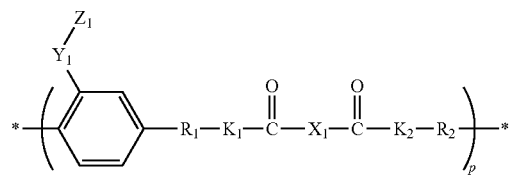

Chemical Formula 2

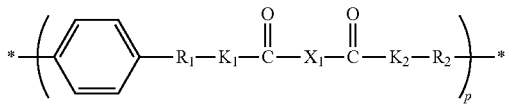

In the above Formula 1, $Y_1$ is —$(CH_2)_n$—, wherein n is 1 to 20, $Z_1$ is a group selected from

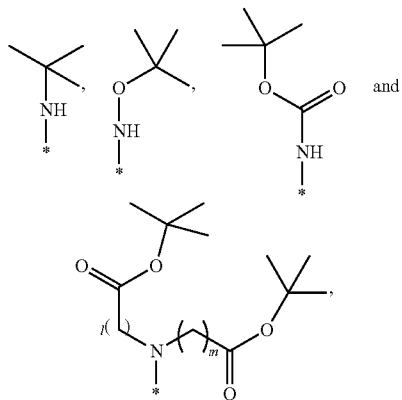

m and l are each independently an integer ranging from 1 to 4, and in the above Formula 1 and Formula 2, $K_1$ and $K_2$ are each independently, single bond, oxygen atom or —NH—;

$X_1$ is

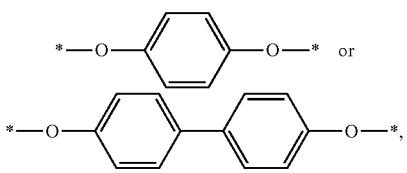

$R_1$ and $R_2$ are each independently

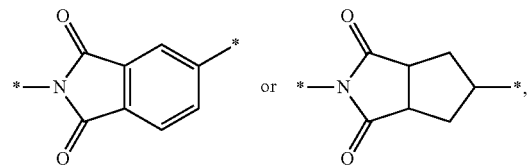

* indicates a point of attachment bonded to —$K_1$—C(=O)— or —$K_2$—C(=O)—, and p and q are each independently an integer ranging from 10 to 2,000.

Otherwise, the first alignment layer includes the first layer including a polyimide which does not include a photoreactive group and the second layer including a third repeating unit represented by Chemical Formula 3 and a fourth repeating unit represented by Chemical Formula 4, and the first layer is positioned closer to the substrate than the second layer.

Chemical Formula 3

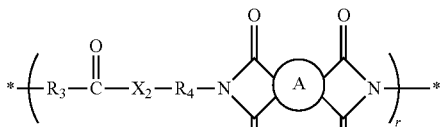

Chemical Formula 4

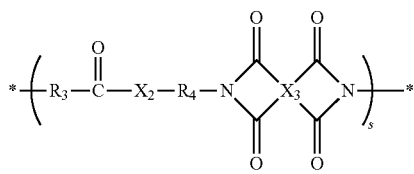

In the above Formulae 3 and 4, $X_2$ is a sulfur atom, an oxygen atom or —NH—, at least one side of the $R_3$ and $R_4$ includes an aromatic ring and at least one point of attachment of —C(=O)—$X_2$— is bonded to the aromatic ring, and in the above Formula 3,

is a group selected from

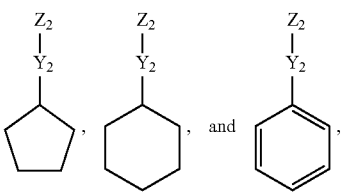

$Y_2$ is —$(CH_2)_n$—, wherein n is 1 to 20, $Z_2$ is a group selected from

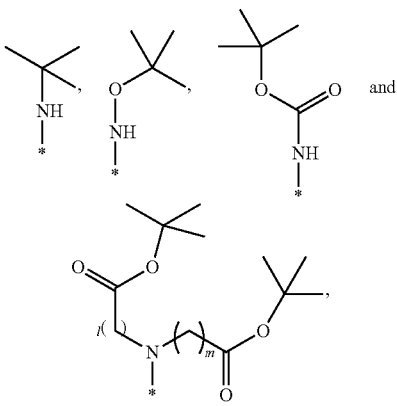

and m is an integer ranging from 1 to 4.

In the above Formula 4, $X_3$ is a tetravalent organic group derived from an alicyclic acid dianhydride or an aromatic acid dianhydride, and r and s are each independently an integer ranging from 10 to 2,000.

A detailed explanation of the other identical constituent elements will be omitted.

Then, the second display panel 200 will be described.

Between the counter member 210 formed of transparent glass or plastic and the liquid crystal layer 3, a light blocking member 220, a color filter 230, an overcoat 250, and a second alignment layer 21 are positioned. The counter member 210 may be formed as a roof layer in a display structure in which a plurality of micro spaces is formed and an alignment material and a liquid crystal material are placed into the micro spaces to form an alignment layer and a liquid crystal layer. Hereinafter, the counter member 210 will be described as the second substrate 210 corresponding to the first substrate 110 as being overlapped with the first substrate 110.

The light blocking member 220 is positioned between the second substrate 210 and the liquid crystal layer 3. A plurality of color filters 230 is positioned between the second substrate 210 and the liquid crystal layer 3, and the color filters 230 may be positioned between the adjacent light blocking members 220.

If the second protective layer 180b of the first display panel 100 is formed as a color filter, the color filter 230 of the second display panel 200 may be omitted. Further, the light blocking member 220 of the second display panel 200 may also be positioned on the first display panel 100.

Although the overcoat 250 is positioned between a layer on which the color filter 230 and the light blocking member 220 are positioned and the liquid crystal layer 3, the overcoat 250 may be omitted.

The second alignment layer 21 is positioned between the overcoat 250 and the liquid crystal layer 30→3. The second alignment layer 21 may include the same material as the above-described first alignment layer 11.

In the present exemplary embodiment, the liquid crystal layer 3 may include liquid crystal having negative dielectric anisotropy or positive dielectric anisotropy.

In the illustrated liquid crystal display (LCD) according to an Example, the common electrode 270 has a planar flat shape and the pixel electrode 191 includes a plurality of branched electrodes. However, in the liquid crystal display (LCD) according to another Example of the present disclosure, the pixel electrode 191 may have a planar flat shape and the common electrode 270 may include a plurality of branched electrodes.

In the present exemplary embodiment, the two field generating electrodes include the pixel electrode 191 and the common electrode 270, and the insulating layer 180c is positioned between the pixel electrode 191 and the common electrode 270. The pixel electrode 191 and the common electrode 270 are overlapped with each other with the insulating layer 180c interposed therebetween. The present disclosure is not limited to these Examples, and the positions of the pixel electrode 191 and the common electrode 270 may vary relative to each other.

While this disclosure has been described in connection with what is presently considered to be practical example embodiments, it is to be understood that the disclosure is not limited to the present embodiments, but, on the contrary, is intended to cover various modifications and equivalent arrangements included within the spirit and scope of the appended claims.

What is claimed is:

1. A photo alignment agent comprising a copolymer of a diamine and a dianhydride,
   wherein the copolymer comprises a repeating unit, comprising a first group derived from the diamine and a second group derived from the dianhydride;
   wherein any one of the first group and the second group comprises a photoreactive group and the other one of the first group and the second group comprises at least one selected from a tert-butyl group, a tert-butoxy group, a tert-butyloxycarbonyl group, and a di-tert-butyloxycarbonyl group; and
   wherein the repeating unit comprises a first repeating unit represented by Formula 1 and a second repeating unit represented by Formula 2:

Chemical Formula 1

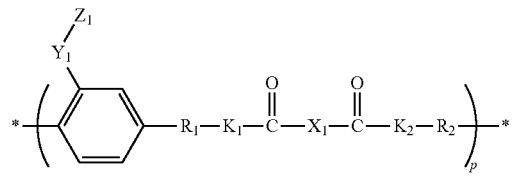

Chemical Formula 2

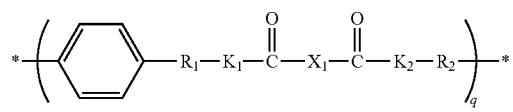

wherein in Formula 1, $Y_1$ is —$(CH_2)_n$—, wherein n is 1 to 20, $Z_1$ is a group selected from

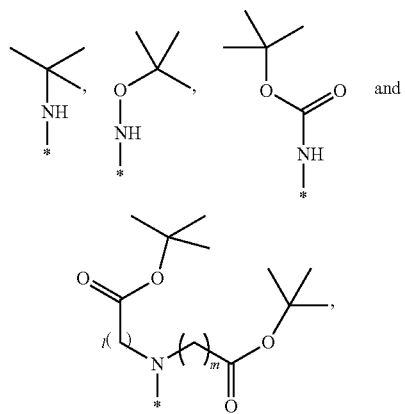

and m and l are each independently an integer ranging from 1 to 4, and in Formula 1 and Formula 2, $K_1$ and $K_2$ are each independently a single bond, an oxygen atom or —NH—;

$X_1$ is

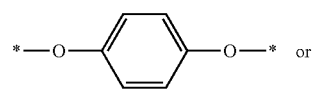 or

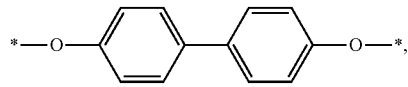

$R_1$ and $R_2$ are each independently

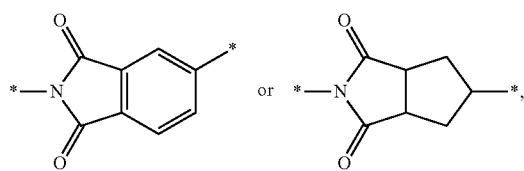

* indicates a point of attachment bonded to —$K_1$—C(=O)— or —$K_2$—C(=O)—, and
p and q are each independently an integer ranging from 10 to 2,000.

2. The photo alignment agent of claim 1, wherein:
in the repeating unit, an amount of the first repeating unit is 3 weight percent to 15 weight percent based on a total 100 weight percent of the repeating unit.

3. The photo alignment agent of claim 1, wherein:
in Formula 1 and Formula 2, is independently

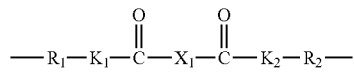

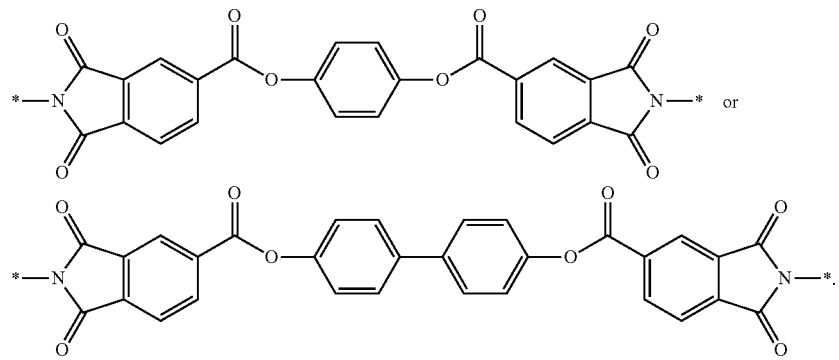

4. The photo alignment agent of claim 1, wherein:
the repeating unit comprises a third repeating unit represented by Formula 3 and a fourth repeating unit represented by Formula 4:

Chemical Formula 3

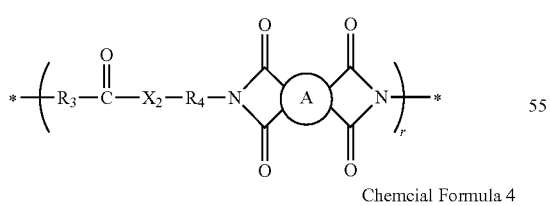

Chemcial Formula 4

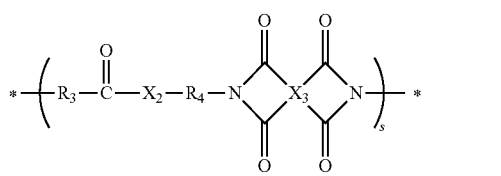

in Formulae 3 and 4,
$X_2$ is a sulfur atom, an oxygen atom or —NH—;
at least one side of the $R_3$ and $R_4$ comprises an aromatic ring and at least one point of attachment of —C(=O)—$X_2$— is bonded to the aromatic ring, and

is a group selected from

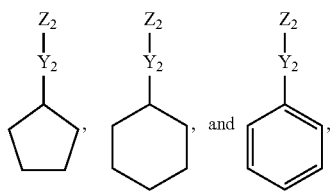

and
$Y_2$ is —$(CH_2)_n$—,
n is 1 to 20, $Z_2$ is a group selected from

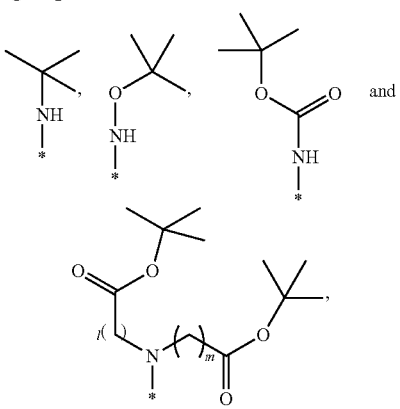

and
m and l are each independently an integer ranging from 1 to 4, and
in Formula 4,
$X_3$ is a tetravalent organic group derived from an alicyclic acid dianhydride or an aromatic acid dianhydride and r and s are each independently an integer ranging from 10 to 2,000.
5. The photo alignment agent of claim 4, wherein:
in the repeating unit, an amount of the third repeating unit is 3 weight percent to 15 weight percent based on a total 100 weight percent of the repeating unit.
6. The photo alignment agent of claim 4, wherein:
in Formula 3 and Formula 4,
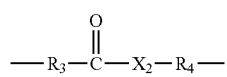
is independently one selected from
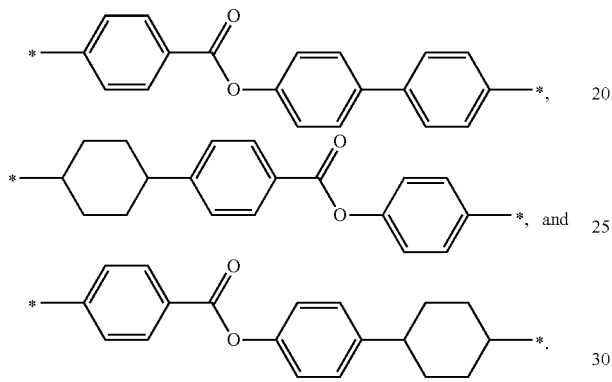
* * * * *